(12) United States Patent
Ryu et al.

(10) Patent No.: US 12,711,884 B2
(45) Date of Patent: Aug. 18, 2026

(54) BACKGROUND AND/OR AMBIENT SENSOR BASED IMAGE PROCESSING FOR TRANSPARENT DISPLAYS

(71) Applicant: Faurecia IRYStec Inc., Montreal (CA)

(72) Inventors: Seungchul Ryu, Greenfield Park (CA); Hyunjin Yoo, Nepean (CA); Jean Lorchat, Montreal (CA); Tara Akhavan, Paris (FR)

(73) Assignee: Faurecia IRYStec, Inc., Montreal (CA)

( * ) Notice: Subject to any disclaimer, the term of this patent is extended or adjusted under 35 U.S.C. 154(b) by 56 days.

(21) Appl. No.: 18/417,418

(22) Filed: Jan. 19, 2024

(65) Prior Publication Data

US 2025/0239194 A1 Jul. 24, 2025

(51) Int. Cl.
*G09G 3/00* (2006.01)
*G01J 1/42* (2006.01)
*G06F 3/01* (2006.01)

(52) U.S. Cl.
CPC .............. *G09G 3/03* (2020.08); *G01J 1/4204* (2013.01); *G06F 3/013* (2013.01); *G09G 2320/0686* (2013.01); *G09G 2320/0693* (2013.01); *G09G 2340/12* (2013.01); *G09G 2354/00* (2013.01); *G09G 2380/10* (2013.01)

(58) Field of Classification Search
CPC ........................................................ G09G 3/03
See application file for complete search history.

(56) References Cited

U.S. PATENT DOCUMENTS

2015/0356902 A1* 12/2015 Seo ...................... G09G 3/3208 345/589
2015/0371579 A1* 12/2015 Yu ........................ G09G 3/3208 345/690
2019/0113965 A1* 4/2019 Kumar .................... G06F 3/147

FOREIGN PATENT DOCUMENTS

CN 113866983 A 12/2021
KR 101610169 B1 4/2016

* cited by examiner

*Primary Examiner* — Shivang I Patel
(74) *Attorney, Agent, or Firm* — Reising Enthington P.C.

(57) ABSTRACT

A system and method are provided for enhancing content to be displayed on a transparent display. This content enhancement method for a transparent display includes: obtaining content to be displayed on a transparent display; obtaining ambient light data from an ambient light sensor; obtaining transparent display background data for the transparent display; determining localized visibility degradation data for a plurality of local portions of the transparent display, wherein the localized visibility degradation is determined based on the ambient light data and the transparent display background data; and generating enhanced content for display on the transparent display based on the localized visibility degradation data.

14 Claims, 3 Drawing Sheets

Background Sensor 20
VE
V
Ambient Light Sensor 18
10
14
Computer 16
Processor 22
Memory 24
Transparent Display 12

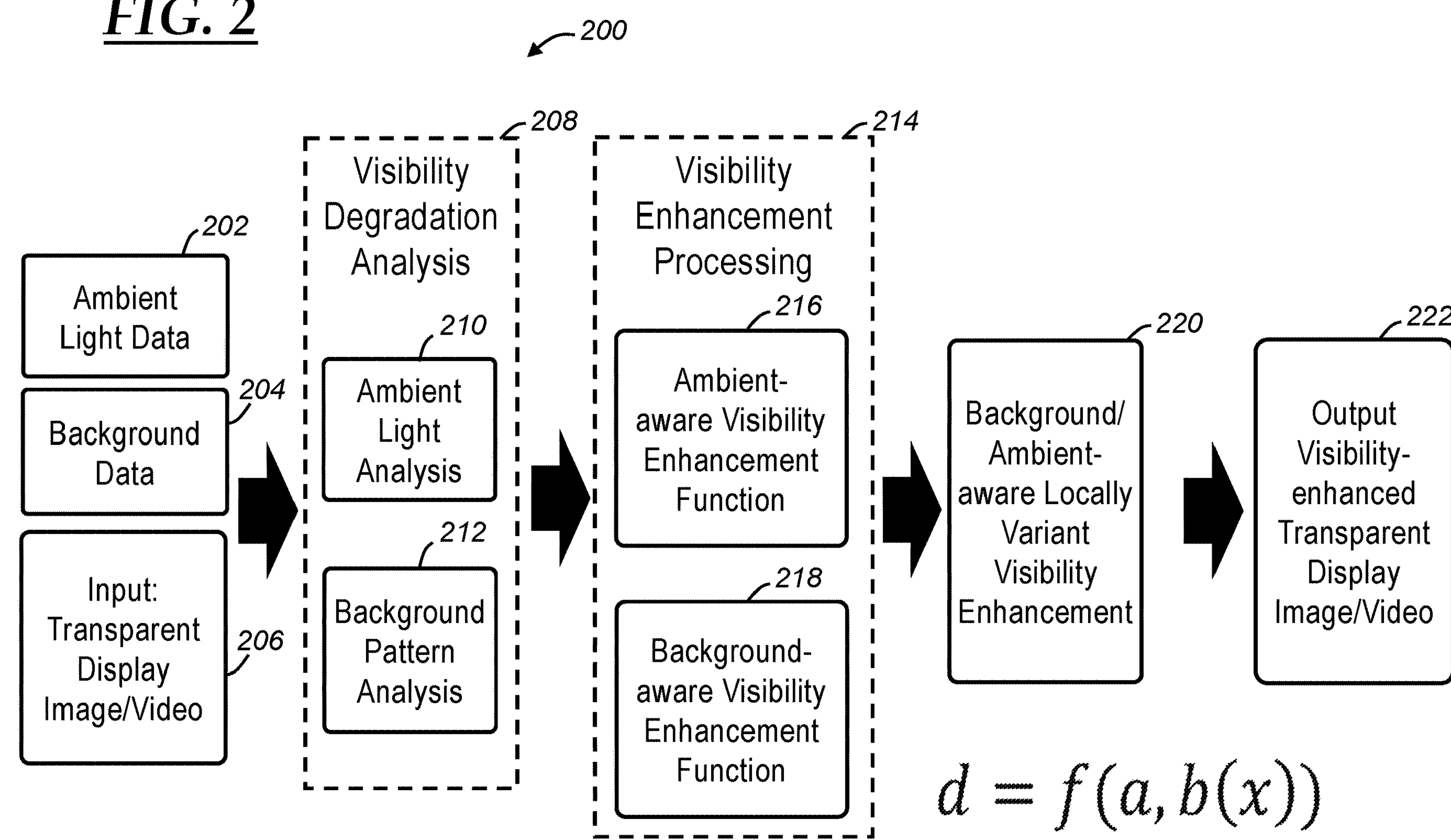
FIG. 2
200
202
Ambient Light Data
204
Background Data
206
Input: Transparent Display Image/Video
208
Visibility Degradation Analysis
210
Ambient Light Analysis
212
Background Pattern Analysis
214
Visibility Enhancement Processing
216
Ambient-aware Visibility Enhancement Function
218
Background-aware Visibility Enhancement Function
220
Background/Ambient-aware Locally Variant Visibility Enhancement
222
Output Visibility-enhanced Transparent Display Image/Video
$d = f(a, b(x))$ 300
310
Obtain Content to be Displayed
320
Obtain Ambient Light Data from Ambient Light Sensor
330
Obtain Background Data from Background Sensor or Memory
340
Determine Visibility Degradation Data Based on Ambient Light Data and Background Data
350
Generate Enhanced Content Based on Visibility Degradation Data

BACKGROUND AND/OR AMBIENT SENSOR BASED IMAGE PROCESSING FOR TRANSPARENT DISPLAYS

TECHNICAL FIELD

This invention relates to methods and systems for processing images for improved display characteristics, namely enhancing visual perceptibility of content displayed on a transparent display through sensor-based image processing techniques.

BACKGROUND

Transparent displays have gained significant attention in recent years due to their potential applications in various industries. However, one of the primary challenges associated with transparent displays is the visibility of content displayed on them. The transparency of these displays allows the background behind them to be partially visible, which can make it difficult for users to clearly see or discern the displayed content. This issue may become more pronounced when the background is dynamic, such as in the case of a heads-up display (HUD) in a vehicle, where the background changes based on the surrounding environment. Even with static backgrounds, the partial visibility of the background can still hinder the clarity and legibility of the displayed content.

Korean Patent Application Publication 10-1610169 B2, entitled "HEAD-UP DISPLAY AND CONTROL METHOD THEREOF," teaches a vehicle heads-up display (HUD) system that incorporates a background mask to enhance the visibility of display graphics. The background mask is a configurable layer in the HUD which acts as a backdrop for the displayed information. The colors and opacity of this background mask are adjusted based on analysis of external images captured by a camera and ambient light conditions. This adjustment may be made and applied object-wise and ensures the HUD's graphics are clearly visible against varied real-world backgrounds and in different lighting environments, thereby improving driver safety and convenience through enhanced readability of the display. This technology, thus, uses an opaque/colorized backdrop rather than adjusting pixel values of the content to be displayed.

China Patent Application Publication 113866983 A, entitled "Head-up display device and display method of head-up display device," relates to a head-up display (HUD) system for vehicles, designed to enhance the clarity of display graphics in diverse environmental conditions. This system incorporates an image acquisition module and an image processing module to analyze background scenes. Utilizing pixel point statistics and sub-area recognition, it adjusts the display state of the HUD in terms of brightness, color, and opacity. These adjustments aim to improve visibility of the HUD's graphics against varying backgrounds and light intensities, addressing visibility challenges prevalent in conventional HUD systems. This approach results in an improved user experience by maintaining clear and readable display information under a wide range of driving conditions.

However, the disclosed approaches are suboptimal for various scenarios and implementations, at least because said technologies only aim to address the entirety of the display, treating different content within the displayed image the same or providing an opaque/colorized backdrop as a straightforward solution rather than adjusting actual pixel values. This results in determining global adjustments for the displayed image and does not appreciate that certain portions within the same displayed image desirably should be adjusted locally to provide an enhanced output having pixelwise or localized adjustments. Moreover, simply adapting conventional technologies to process individual portions of the image/content to be displayed is not suitable for real-time image enhancement, nor does such a hypothetical process provide for consistency amongst neighboring pixels or regions while still providing individualized or localized adjustments in real-time.

Therefore, there is a need for a solution that enhances the visibility and/or readability of content on transparent displays, regardless of the nature of the background, and that is adaptable and suitable for displays having varying content within a single image to be displayed.

SUMMARY

According to one aspect of the disclosure, there is provided a method of enhancing content to be displayed on a transparent display. The method includes: obtaining content to be displayed on a transparent display; obtaining ambient light data from an ambient light sensor; obtaining transparent display background data for the transparent display; determining localized visibility degradation data for a plurality of local portions of the transparent display, wherein the localized visibility degradation is determined based on the ambient light data and the transparent display background data; and generating enhanced content for display on the transparent display based on the localized visibility degradation data.

According to various embodiments, the method may further include any one of the following features or any technically-feasible combination of some or all of the features:

- the localized visibility degradation data is pixelwise visibility degradation data whereby each local portion of the plurality of local portions of the content corresponds to a pixel of the content;
- the enhanced content is generated based on the pixelwise visibility degradation data so that the enhanced content includes a plurality of adjusted pixel values, and wherein each adjusted pixel value of the plurality of adjusted pixel values is for a pixel of the content and is determined based on respective data of the pixelwise visibility degradation data for the pixel;
- determining the adjusted pixel value includes controlling a transmittance rejection rate for the pixel based on the respective data of the pixelwise visibility degradation data for the pixel;
- the transparent display is a static-background transparent display having a static background, and wherein the transparent display background data is predetermined image data representing the static background;
- the transparent display is a dynamic-background transparent display having a dynamic background, and wherein the transparent display background data is determined based on image sensor data captured by an image sensor;
- the localized visibility degradation data is determined based on a viewing location of a viewer that is positioned to view the enhanced content once generated and displayed; and/or
- the viewing location of the viewer is determined based on a driver monitoring sensor.

According to another aspect of the disclosure, there is provided a system that carries out the above-described method of enhancing content. The system may comprise a transparent display enhancement system that includes a processing subsystem having at least one processor and memory storing computer instructions. The transparent display enhancement system is configured so that, when the computer instructions are executed by the at least one processor, the transparent display enhancement system: obtains content to be displayed on a transparent display; obtains ambient light data from an ambient light sensor; obtains transparent display background data for the transparent display; determines localized visibility degradation data for a plurality of local portions of the transparent display, wherein the localized visibility degradation is determined based on the ambient light data and the transparent display background data; and generates enhanced content for display on the transparent display based on the localized visibility degradation data.

According to various embodiments, the transparent display enhancement system may further include any one of the following features or any technically-feasible combination of some or all of the features:

- the localized visibility degradation data is pixelwise visibility degradation data whereby each local portion of the plurality of local portions of the content corresponds to a pixel of the content;
- the enhanced content is generated based on the pixelwise visibility degradation data so that the enhanced content includes a plurality of adjusted pixel values, and wherein each adjusted pixel value of the plurality of adjusted pixel values is for a pixel of the content and is determined based on respective data of the pixelwise visibility degradation data for the pixel;
- determining the adjusted pixel value includes controlling a transmittance rejection rate for the pixel based on the respective data of the pixelwise visibility degradation data for the pixel;
- the transparent display is a static-background transparent display having a static background, and wherein the transparent display background data is predetermined image data representing the static background;
- the transparent display is a dynamic-background transparent display having a dynamic background, and wherein the transparent display background data is determined based on image sensor data captured by an image sensor;
- the localized visibility degradation data is determined based on a viewing location of a viewer that is positioned to view the enhanced content once generated and displayed;
- the viewing location of the viewer is determined based on a driver monitoring sensor;
- the transparent display enhancement system includes the ambient light sensor; and/or
- the transparent display enhancement system includes the transparent display.

According to yet another aspect of the disclosure, there is provided a non-transitory, computer-readable memory comprising computer instructions that, when executed by at least one processor of a processing subsystem, causes the processing subsystem to: obtain content to be displayed on a transparent display; obtain ambient light data from an ambient light sensor; obtain transparent display background data for the transparent display; determine localized visibility degradation data for a plurality of local portions of the transparent display, wherein the localized visibility degradation is determined based on the ambient light data and the transparent display background data; and generate enhanced content for display on the transparent display based on the localized visibility degradation data.

According to various embodiments, the non-transitory, computer-readable memory may further be characterized in light any one of the features or any technically-feasible combination of some or all of the features noted above in connection with the method and the transparent display enhancement system.

According to yet another aspect of the disclosure, there is provided a vehicle configured to perform the method, such as by way of the processing subsystem. Furthermore, according to another aspect of the disclosure, there is provided a vehicle having the transparent display enhancement system. And, according to yet another aspect of the disclosure, there is provided a vehicle having the non-transitory, computer-readable memory.

BRIEF DESCRIPTION OF THE DRAWINGS

Preferred exemplary embodiments will hereinafter be described in conjunction with the appended drawings, wherein like designations denote like elements, and wherein:

FIG. 2 is a block diagram representing a framework and processing of said framework, particularly configured, in embodiments, for performing a method of enhancing content to be displayed on a transparent display, according to one embodiment.

DETAILED DESCRIPTION

Figure 1:
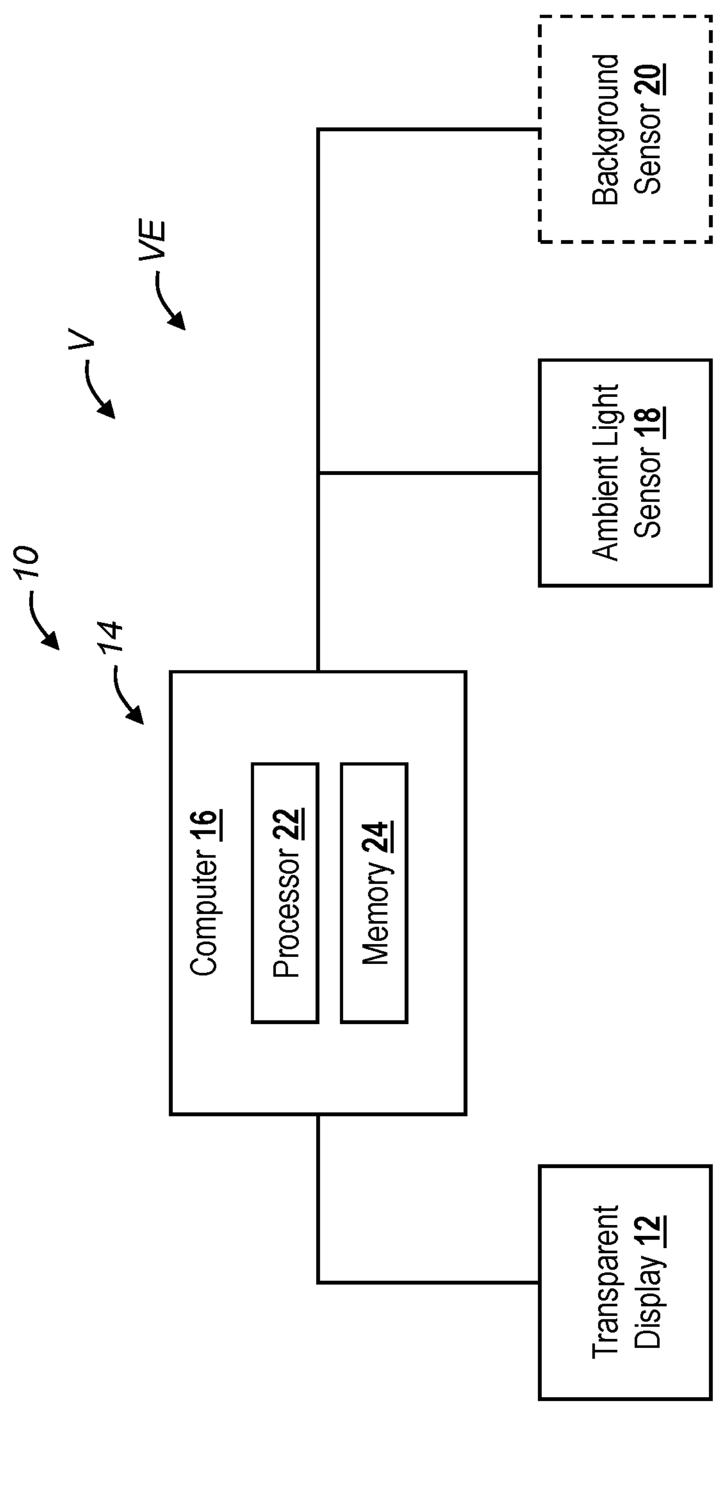
FIG. 1 is a block diagram illustrating a transparent display enhancement system, according to one embodiment.

A system and method is provided for enhancing content to be displayed on a transparent display. The system, which may be referred to as a transparent display enhancement system, is used to implement disclosed techniques, including those of the method discussed herein. The method is used to generate enhanced content for display on the transparent display, particularly through determining localized visibility degradation data based on ambient light data captured by an ambient light sensor and background data ("transparent display background data"), at least according to embodiments. Moreover, in at least some embodiments, the localized visibility degradation data is pixelwise visibility degradation data, where each local portion of content to be displayed corresponds to an individual pixel of the content. Such disclosed techniques enable enhancing visibility or perceptibility (collectively, "visibility") of content displayed on transparent displays, particularly adjusting portions of the content to be displayed individually.

In scenarios with high or bright ambient light conditions, display of content on transparent displays can be significantly degraded, as the transparent nature of these displays allows light from surroundings to pass through, often resulting in reduced contrast and visibility of the displayed content. This degradation in display quality can lead to decreased legibility and comprehension of the information being presented. To address this issue, embodiments include using an ambient light sensor to capture ambient light sensor data, which is then used to determine the localized visibility degradation data.

In addition to high ambient light conditions, cluttered backgrounds can also contribute to the degradation of content displayed on transparent displays. When the background behind the display is visually complex or cluttered, the partially visible background can interfere with the legibility of the displayed content. The presence of multiple objects or intricate patterns in the background can create visual distractions, making it challenging for users to focus on and interpret the content being presented. Furthermore, in the case of dynamic-background transparent displays such as heads up displays (HUDs), this problem is even more pronounced and complex due to the dynamic nature of the background scene, such as where the background is rapidly changing and/or includes areas of varying hue and brightness, for example. Such real-life effects may result in reduced clarity, readability, and comprehension of the displayed information. Therefore, according to embodiments, the disclosed technology mitigates the impact of cluttered backgrounds on transparent displays, ensuring optimal visibility and readability of the displayed content, particularly through localized pixel adjustments made according to the localized visibility degradation data.

Although the discussion of the embodiments below is in the context of a vehicle, such as a passenger automobile, it will be appreciated that the system and method may be applied to other systems that use a transparent display, such as where there is a desire to enhance visibility or otherwise mitigate real-time degradations for the transparent display.

With reference to FIG. 1, there is shown a transparent display enhancement system 10 for a vehicle V having a transparent display 12, a processing subsystem 14 having at least one computer 16, and an ambient light sensor 18. According to embodiments, the transparent display enhancement system 10 further includes a background sensor 20, which is optional (as indicated by the dashed lines) as it may be used in embodiments where the transparent display 12 is a dynamic-background transparent display. The transparent display enhancement system 10 is incorporated into vehicle electronics VE of the vehicle V, as shown in FIG. 1, and the vehicle V may be a passenger automobile, such as a car, truck, or SUV, or may be another passenger vehicle, such as an aircraft or maritime vessel, etc. However, in other embodiments, the transparent display enhancement system 10 may be incorporated into another device, component, or system, such as a non-automotive or non-vehicular system, for example, in a smartphone having a transparent display. The transparent display 12 receives image data representing an image or content to display on the transparent display 12, particularly enhanced image data representing enhanced content generated by the processing subsystem 14. According to embodiments, the transparent display enhancement system 10 may include one or more other components in addition to or in lieu of those shown and described, as will be appreciated by those skilled in the art in light of the teachings herein.

The transparent display 12 is an electronic transparent display that emits light, and may be comprised of any of a variety of different display technologies and components. In embodiments, the transparent display 12 is a dynamic-background transparent display and, in other embodiments, is a static-background transparent display. Both dynamic-background and static-background transparent displays offer unique advantages and can be used in various applications depending on the specific requirements and use cases.

A dynamic-background transparent display is a type of display technology that allows users to see through the display (at least partially) while presenting visual information with a dynamic or changing background. This type of display can include heads-up displays (HUDs) or other displays that provide real-time updates or interactive elements on a transparent surface. HUDs provide real-time information to the user while allowing them to maintain their focus on the surroundings. HUD technology can be implemented in various forms, such as in automotive windshields, aviation cockpit displays, or even in smart glasses. In automotive applications, HUDs project information like speed, navigation instructions, or warnings directly onto the windshield, enabling drivers to access crucial information without taking their eyes off the road. In aviation, HUDs are used to display flight data, navigation information, and even targeting information for military aircraft. Smart glasses, like Google Glass™, utilize HUD technology to overlay digital information onto the user's field of view, enabling augmented reality experiences.

On the other hand, a static-background transparent display refers to a display that has a fixed or stationary background, such as a non-transparent surface—as suggested here, the word "transparent" refers to the disguised or ostensibly invisible or at least partially transparent screen on which content is displayed, although the background or backdrop of the display is non-transparent, such as wood, opaque glass, or other suitable surface. In this regard, this type of static display may present visual information on a transparent surface, but the background remains static and does not change. These static-background transparent displays appear as ordinary surfaces, such as wood, glass, or other materials when not in use, but can emit light or display images when powered on. This technology may utilize OLED (Organic Light Emitting Diodes) or specialized liquid crystal display (LCD) panels. Disguised wood or marble displays are each examples of a static-background transparent display, and these displays are designed to seamlessly blend with the environment, mimicking the appearance of wood, marble, or other materials when turned off. These disguised displays may be used in interior design, furniture, or even in automotive design to achieve a sophisticated and integrated look, for example. In embodiments, the static-background transparent display may appear as a regular glass surface when turned off but may emit light or display images when powered on, or may be used in applications like smart windows, retail displays, or architectural installations, where the display needs to be transparent when not in use.

The processing subsystem 14 is for processing content in order to enhance the content for display on the transparent display 12. The processing subsystem 14 is configured to perform the method discussed herein. The processing subsystem 14 includes the at least one computer 16. In FIG. 1, the at least one computer 16 is illustrated as a single computer; however, it will be appreciated that multiple computers may be used as the at least one computer 16, together configured to perform the method and any other functionality attributed to the processing subsystem 14, as described herein. Each of the at least one computer 16 includes the at least one processor 22 and memory 24, with the memory 24 storing the computer instructions for execution by the at least one processor 22. The memory 24 is non-transitory, computer-readable memory. It will also be appreciated that the computer instructions may be stored on different physical memory devices and/or executed by different processors or computers of the processing subsystem 14, together causing performance of the method and attributed functionality discussed herein.

In one embodiment, the at least one processor 22 is or includes a central processing unit (CPU) and a graphics processing unit (GPU), each of which is used to perform different functionality of the processing subsystem 14. For example, a GPU is used for image signal processing; on the other hand, other functionality attributed to the processing subsystem 14 is performed by the CPU, such as packaging of data to be sent over a data communications channel, such as a controller area network (CAN). Of course, this is but one example of an implementation for the at least one computer 16, as those skilled in the art will appreciate that other hardware devices and configurations may be used, oftentimes depending on the particular application in which the at least one computer 16 is used.

The ambient light sensor 18 is used to detect information about ambient light at or surrounding the transparent display 12. The ambient light sensor 18 captures ambient light data to improve visibility in image processing signals. The term ambient light sensor encompasses various sensors capable of measuring the intensity of ambient light in the environment. Examples of commonly used ambient light sensors include photodiodes, phototransistors, and photovoltaic cells. These sensors are designed to accurately capture the ambient light present in the surroundings. Furthermore, advanced technologies like charge-coupled devices (CCD) and complementary metal-oxide-semiconductor (CMOS) sensors may be utilized to ensure high-quality data acquisition. By integrating the captured ambient light data into image processing algorithms, the transparent display enhancement system 10 aims to enhance visibility and provide an improved visual experience for users.

The background sensor 20 is a camera that is configured and/or arranged to capture light information perceivable by humans. This background sensor 20 is specifically designed for capturing light data located behind the transparent display 12. For example, where the transparent display 12 is a HUD in a vehicle, the background sensor 20 is a visible light camera directed to an area in front of the vehicle and directly behind the transparent display relevant to the location of the viewer—i.e., the background sensor 20 is directed to capture light information observable by the viewer and that passes through the transparent display. In this sense, the term “background sensor” refers to an image sensor that detects and measures the intensity of light (e.g., in three channels, for example RGB) present in the background of and behind the transparent display. The background sensor 20 may be positioned in a predetermined position, such as mounted at a predetermined location and at a predetermined orientation on a vehicle, and this information may be used for determining what portions of the background scene correspond to what the viewer visually perceives, such as when seated or otherwise positioned in a known location (e.g., a driver’s seat). By employing a visible light camera, the transparent display enhancement system 10 enables capturing images of the background environment as perceived by a human. This allows for improved visibility and enhanced image processing signals as a result of the disclosed method, for example. Accordingly, by integrating the background light data captured by the visible light camera into this framework, the disclosed technology aims to provide an enhanced visual experience for users of transparent displays, particularly in HUD applications, at least in embodiments.

With reference to FIG. 2, there is shown an implementation of a transparent display enhancement process or framework 200 in which software modules are used to implement various functionality or processing of the method disclosed herein, which is discussed in more detail below with respect to FIG. 3. Each of the software modules 200-218 is implemented using computer instructions stored in memory of the system, such as in the memory 24 of the processing subsystem 14 of FIG. 1. The framework 200 uses inputs 202-206 to generate enhanced content for display on a transparent display, such as the transparent display 12. The inputs 202-206 include ambient light data 202, transparent display background data 204, and initial content data 206. The ambient light data 202 is or is at least based on sensor data captured by an ambient light sensor, such as the ambient light sensor 18.

The transparent display background data 204 is data indicating visible light information concerning an area behind the transparent display, particularly an area directly behind the transparent display (in the case of a static-background transparent display) or an area appearing behind the transparent display from the perspective of a viewer, such as a driver of a vehicle (in the case of a dynamic-background transparent display). In the case of a static-background transparent display, the transparent display background data (also referred to simply as “background data”) 204 is predetermined data representing the area directly behind the transparent display, particularly representing information representing a visible depiction of a surface directly behind the transparent display. For example, a photograph or a graphical reconstruction or representation of the surface directly behind the transparent display is prestored in memory of the system, such as the memory 24 of the processing subsystem 14.

The initial content data 206 is data representing content to be displayed prior to adjustments or other processing performed by the method as discussed herein. The initial content data 206 may be a graphical user interface, a video feed, prestored images or graphics, or a combination thereof. According to embodiments, the content to be displayed includes dynamic content (i.e., content determined at run-time) and/or static content (i.e., content prestored, such as content stored in memory of the system as a part of manufacturing or initial configuration).

Processing of the framework 200 is performed in two phases: visibility degradation analysis 208 and visibility enhancement processing 214. The visibility degradation analysis 208 is used to determine real-time degradation information, which is then used by the visibility enhancement processing 214 to generate enhanced content for display on the transparent display.

The visibility degradation analysis 208 takes, as input, the ambient light data 202 and the transparent display background data 204. Using this input, the visibility degradation analysis 208 generates an ambient-aware visibility degradation degree or value a through ambient light analysis 210 as well as a background-aware visibility degradation mask b(x) through background pattern analysis 212. The ambient-aware visibility degradation degree a is calculated based on the ambient light data. As discussed above, when the background is dynamic, the background data 204 may be or include a background image captured by the background sensor. And, when the background is static, the background image may be pre-captured and stored as an image. The background image is analyzed and processed to obtain a spatially-varying background-aware degradation mask b(x). For both the ambient-aware degradation degree a and the background-aware degradation mask b(x), a higher value indicates more visibility degradation; however, of course, in other embodiments, higher values may indicate less visibility degradation.

According to one embodiment, the ambient-aware degradation degree a is determined using the following algorithm:

$$a=(c1*(amb)^{c2}+c3)/N$$

where: amb is the output of the ambient sensor (the ambient light data 202); c1, c2, c3 are controlling parameters; and N is a normalization factor. The controlling parameters c1, c2, c3 may be pre-determined values that are determined through empirical testing and observation, and may be tailored through said testing and corresponding empirical analysis in order to adapt or determine controlling parameters suitable for the implementation in which the framework 200 is being used.

According to one embodiment, the background-aware degradation mask b(x) is determined using the following algorithm:

imgb: the background image (normalized in [0, 1])

$$img_{yb}=RGB\_\text{to\_GRAY}(img_b)$$

$$img_t=\text{median\_filter}(img_{yb},k_m)$$

$$img_t=\text{Gaussian\_blur\_filter}(img_t,k_{G1})$$

$$b(x)=(img_t)^s \text{ where } 0<s<1$$

where $k_m$, $k_{G1}$ are the kernel size of each filter and s is a non-linearity controlling parameter. The non-linearity controlling parameter s may be comprised of a pre-determined value that are is determined through empirical testing and observation, and may be tailored through said testing and corresponding empirical analysis in order to adapt or determine controlling parameters suitable for the implementation in which the framework 200 is being used.

The visibility enhancement processing 214 takes, as input, the ambient-aware visibility degradation degree a and the background-aware visibility degradation mask b(x). Using this input, the visibility enhancement processing 214 applies an ambient-aware visibility enhancement function 216 to the ambient-aware visibility degradation degree a and a background-aware visibility enhancement function 218 to the background-aware visibility degradation mask b(x). The visibility is enhanced by adjusting the transmittance rejection rate for degraded pixels. The amount of transmittance rejection rate adjustment is based on the pixel-wise background-aware mask (b(x)) and ambient-aware visibility degradation degree (a). The transmittance rejection rate for each pixel is increased as b(x) has higher value. The transmittance rejection rate is increased as a is increased.

According to one embodiment, the following algorithm is used to implement the visibility enhancement processing 214:

$$img_e=\text{Canny\_edge\_detector}(img_i)$$

$$img_e=\text{Morphological\_dilation\_operator}(img_e,k_d)$$

$$img_e=\text{Gaussian\_blur\_filter}(img_e,k_{G2})/N_e$$

$$R_{tr}=w*(a*b(x))*img_e$$

$$img_p=img_i+R_{tr}$$

where a is the ambient-aware degradation degree, b(x) is the pixel-wise background-aware degradation mask, $img_i$ is the input image to be displayed, $k_d$, $k_{G2}$ are the kernel size of each filter, $N_e$ is a normalization factor, * is pixel-wise multiplication, $R_{tr}$ is the transmittance rejection rate, and $img_p$ is the enhanced image output. The Canny edge detector is an image processing algorithm that identifies edges in images by detecting local maxima of the gradient, effectively highlighting object boundaries through a multi-stage process involving noise reduction, gradient calculation, non-maximum suppression, and edge tracking by hysteresis. The Morphological_dilation_operator is a fundamental operation in mathematical morphology used to expand or enlarge the boundaries of objects or regions in an image by scanning with a structuring element and marking positions that overlap with the object or region. This process effectively increases the size of the objects or regions in the image. The Gaussian blur filter, also commonly known as the Gaussian smoothing filter, is an image processing technique that reduces noise and blurs the image by convolving it with a Gaussian function.

The visibility enhancement processing 214 generates background/ambient-aware locally variant visibility enhancement data 220, which is then applied to the content to generate the visibility-enhanced transparent display content 222 as output, and this output may be enhanced image or video content, for example. This output enhanced content 222 is then displayed on the transparent display for viewing by a viewer, such as a driver or passenger of a vehicle.

Figure 3:
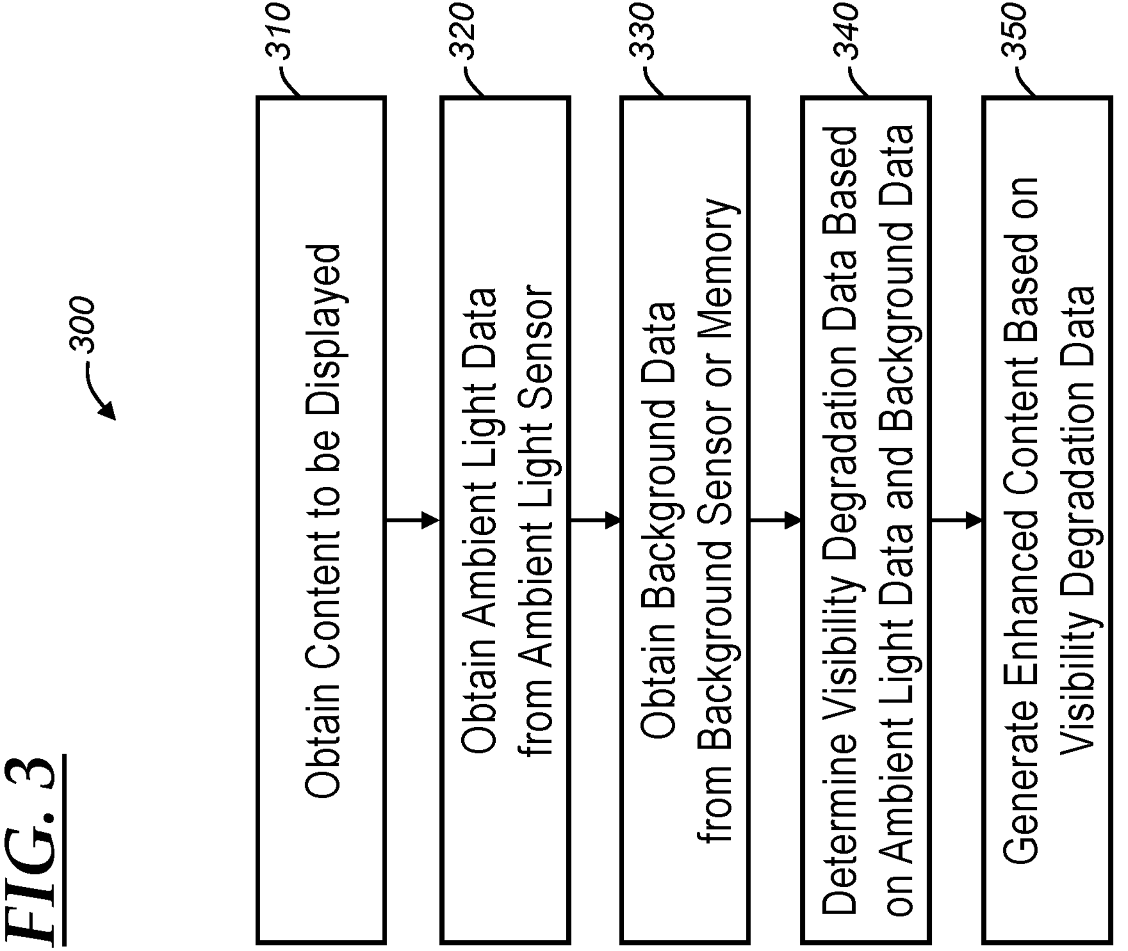
FIG. 3 is a flowchart illustrating a method of enhancing content to be displayed on a transparent display, according to embodiment.

With reference to FIG. 3, there is shown a method 300 of enhancing content to be displayed on a transparent display, according to one embodiment. The method 300 is performed by the transparent display enhancement system 10, which may implement the transparent display enhancement framework 200, as discussed above. Although the steps of the method 300 are discussed and described as being performed in a particular order, those skilled in the art will appreciate that, in other embodiments, the steps may be carried out according to other technically-feasible orders, such as where step 310 is performed at the same time or after step 320.

In step 310, content to be displayed on a transparent display is obtained. The content here is content in its initial stage prior to the visibility enhancement discussed herein, and is represented by initial content data. This initial content data may include any of a variety of different images, graphics, text, or other information that is to be presented on the transparent display 12, and this may include pre-known or predetermined graphics or images and/or may include data obtained in real-time such as through use of a sensor, for example, a camera or radar sensor. The method 300 continues to step 320.

In step 320, ambient light data from an ambient light sensor is obtained. The ambient light data is data that is obtained from an ambient light sensor. The ambient light sensor 18 captures sensor data representing ambient light characteristics, such as intensity, at or around the proximity of the transparent display 12. This sensor data may be processed and stored as ambient light data in memory, such as in memory 24 of the processing subsystem 14. The method 300 continues to step 330.

In step 330, transparent display background data is obtained and, depending on whether the transparent display for displaying the enhanced content is a dynamic-background or static-background transparent display. As discussed above, in the case of the dynamic-background transparent display, sensor data, such as visible light image data, is captured using the background sensor 20. This background data may be stored in memory, such as in memory 24 of the processing subsystem 14. And, in the case of the static-background transparent display predetermined background data is used as the transparent display background data, and may be obtained from memory, such as from the memory 24 of the processing subsystem 14. The method 300 continues to step 340.

In step 340, localized visibility degradation data for a plurality of local portions of the transparent display is determined. The localized visibility degradation is determined based on the ambient light data and the transparent display background data. In other embodiments, global visibility degradation data for the transparent display is determined rather than localized visibility degradation data as is the case in the present embodiment of step 340. The term "global", when used in connection with a transparent display, refers to the entirety of the region that is to be enhanced, often corresponding to the entirety of the display area or region of the transparent display. The term "localized" or "local", when used in connection with a transparent display, refers to a sub-portion (i.e., a portion being less than the whole) of the transparent display, such that the content to be displayed on the transparent display includes a plurality of sub-portion, each being disjointed from one other meaning that the sub-portions are separate and do not share any common area or region of the transparent display. In embodiments, the localized visibility degradation data is pixelwise visibility degradation data whereby each local portion of the plurality of local portions of the content corresponds to a pixel of the content. For example, the embodiment discussed in connection with FIG. 2 provides an algorithm that performs a pixelwise visibility degradation analysis as well as a pixelwise visibility enhancement process that addresses degradations individually. The method 300 continues to step 350.

In step 350, enhanced content for display on the transparent display is generated based on the localized visibility degradation data. In embodiments, the enhanced content is generated based on the pixelwise visibility degradation data discussed above so that the enhanced content includes a plurality of adjusted pixel values; here, each adjusted pixel value of the plurality of adjusted pixel values is for a pixel of the content and is determined based on respective data of the pixelwise visibility degradation data for the pixel. In embodiments, such as the one discussed above in connection with FIG. 2, determining the adjusted pixel value includes controlling a transmittance rejection rate for the pixel based on the respective data of the pixelwise visibility degradation data for the pixel. The method 300 ends.

In embodiments, the enhanced content is then displayed on the transparent display and is continuously updated in real-time using continuously-updated ambient sensor data and, in embodiments such as those employing a dynamic-background transparent display, is continuously updated further on transparent display background data obtained via an image sensor, such as a visible light camera.

According to another embodiment, particularly one employing a dynamic-background transparent display, a viewing location of a viewer is determined and the viewing location is then used to determine transparent display background data, considering the perspective/parallax of the viewer relative to the transparent display and the area or region behind the transparent display; that is, the area or region of the scene that is visible from the perspective of the viewer, such as a driver seated in a driver's seat, is determined so that the transparent display background data is a visual representation of this background area that is visible by the viewer when looking through the transparent display. The viewing location of the viewer is determined to be the location of the viewer's eyes, such as a central location between the two eyes. In embodiments, a driver monitoring sensor, such as one employing an infrared sensor and corresponding eye tracking functionality, is used for determining the location of the viewer's eyes and, accordingly, the viewing location of the viewer. Once determined, the perspective and parallax of the viewer relative to the transparent display and the area or objects behind the transparent display are taken into account, and this involves calculating the relative position and angle of the viewer's eyes in relation to the transparent display and the background area, at least in embodiments. In other embodiments, rather than specifically using eye position/location, head location may be used.

Any one or more of the processors discussed herein may be implemented as any suitable electronic hardware that is capable of processing computer instructions and may be selected based on the application in which it is to be used. Examples of types of processors that may be used include central processing units (CPUs), graphics processing units (GPUs), field-programmable gate arrays (FPGAs), application specific integrated circuits (ASICs), microprocessors, microcontrollers, etc. Any one or more of the non-transitory, computer-readable memory discussed herein may be implemented as any suitable type of memory that is capable of storing data or information in a non-volatile manner and in an electronic form so that the stored data or information is consumable by the processor. The memory may be any a variety of different electronic memory types and may be selected based on the application in which it is to be used. Examples of types of memory that may be used include including magnetic or optical disc drives, ROM (read-only memory), solid-state drives (SSDs) (including other solid-state storage such as solid state hybrid drives (SSHDs)), other types of flash memory, hard disk drives (HDDs), non-volatile random access memory (NVRAM), etc. It should be appreciated that any one or more of the computers discussed herein may include other memory, such as volatile RAM that is used by the processor, and/or multiple processors.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the word "enhancement", "enhanced", and its other forms are not to be construed as limiting the invention to any particular type or manner of image enhancement, but are generally used for facilitating understanding of the above-described technology, and particularly for conveying that such technology is used to address visible degradations of a transparent display.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method of enhancing content to be displayed on a transparent display, comprising:

obtaining content to be displayed on a transparent display;

obtaining ambient light data from an ambient light sensor;

obtaining transparent display background data for the transparent display;

determining localized visibility degradation data for a plurality of local portions of the transparent display, wherein the localized visibility degradation data is determined based on the ambient light data and the transparent display background data, wherein the localized visibility degradation data is pixelwise visibility degradation data whereby each local portion of the plurality of local portions of the content corresponds to a pixel of the content; and generating enhanced content for display on the transparent display based on the localized visibility degradation data, wherein the enhanced content is generated based on the pixelwise visibility degradation data so that the enhanced content includes a plurality of adjusted pixel values, wherein each adjusted pixel value of the plurality of adjusted pixel values is for a pixel of the content and is determined based on respective data of the pixelwise visibility degradation data for the pixel, and wherein determining the adjusted pixel value includes controlling a transmittance rejection rate for the pixel based on the respective data of the pixelwise visibility degradation data for the pixel.

2. The method of claim 1, wherein the transparent display is a static-background transparent display having a static background, and wherein the transparent display background data is predetermined image data representing the static background.

3. The method of claim 1, wherein the transparent display is a dynamic-background transparent display having a dynamic background, and wherein the transparent display background data is determined based on image sensor data captured by an image sensor.

4. The method of claim 3, wherein the localized visibility degradation data is determined based on a viewing location of a viewer that is positioned to view the enhanced content once generated and displayed.

5. The method of claim 4, wherein the viewing location of the viewer is determined based on a driver monitoring sensor.

6. A transparent display enhancement system, comprising:

a processing subsystem having at least one processor and memory storing computer instructions;

wherein the transparent display enhancement system is configured so that, when the computer instructions are executed by the at least one processor, the transparent display enhancement system:

obtains content to be displayed on a transparent display;

obtains ambient light data from an ambient light sensor;

obtains transparent display background data for the transparent display;

determines localized visibility degradation data for a plurality of local portions of the transparent display, wherein the localized visibility degradation data is determined based on the ambient light data and the transparent display background data, wherein the localized visibility degradation data is pixelwise visibility degradation data whereby each local portion of the plurality of local portions of the content corresponds to a pixel of the content; and generates enhanced content for display on the transparent display based on the localized visibility degradation data, wherein the enhanced content is generated based on the pixelwise visibility degradation data so that the enhanced content includes a plurality of adjusted pixel values, wherein each adjusted pixel value of the plurality of adjusted pixel values is for a pixel of the content and is determined based on respective data of the pixelwise visibility degradation data for the pixel, and wherein determining the adjusted pixel value includes controlling a transmittance rejection rate for the pixel based on the respective data of the pixelwise visibility degradation data for the pixel.

7. The transparent display enhancement system of claim 6, wherein the transparent display is a static-background transparent display having a static background, and wherein the transparent display background data is predetermined image data representing the static background.

8. The transparent display enhancement system of claim 6, wherein the transparent display is a dynamic-background transparent display having a dynamic background, and wherein the transparent display background data is determined based on image sensor data captured by an image sensor.

9. The transparent display enhancement system of claim 8, wherein the localized visibility degradation data is determined based on a viewing location of a viewer that is positioned to view the enhanced content once generated and displayed.

10. The transparent display enhancement system of claim 9, wherein the viewing location of the viewer is determined based on a driver monitoring sensor.

11. The transparent display enhancement system of claim 6, further comprising the ambient light sensor.

12. The transparent display enhancement system of claim 6, further comprising the transparent display.

13. A vehicle having the transparent display enhancement system of claim 6.

14. A non-transitory, computer-readable memory comprising computer instructions that, when executed by at least one processor of a processing subsystem, causes the processing subsystem to:

obtain content to be displayed on a transparent display;

obtain ambient light data from an ambient light sensor;

obtain transparent display background data for the transparent display;

determine localized visibility degradation data for a plurality of local portions of the transparent display, wherein the localized visibility degradation data is determined based on the ambient light data and the transparent display background data, wherein the localized visibility degradation data is pixelwise visibility degradation data whereby each local portion of the plurality of local portions of the content corresponds to a pixel of the content; and generate enhanced content for display on the transparent display based on the localized visibility degradation data, wherein the enhanced content is generated based on the pixelwise visibility degradation data so that the enhanced content includes a plurality of adjusted pixel values, wherein each adjusted pixel value of the plurality of adjusted pixel values is for a pixel of the content and is determined based on respective data of the pixelwise visibility degradation data for the pixel, and wherein determining the adjusted pixel value includes controlling a transmittance rejection rate for the pixel based on the respective data of the pixelwise visibility degradation data for the pixel.

* * * * *